United States Patent
Montuori

(10) Patent No.: US 9,533,553 B2
(45) Date of Patent: Jan. 3, 2017

(54) MOTOR VEHICLE PROVIDED WITH A REMOVABLE TOP

(71) Applicant: FCA ITALY S.p.A., Turin (IT)

(72) Inventor: Gianfranco Montuori, Turin (IT)

(73) Assignee: FCA Italy S.p.A., Turin (IT)

(*) Notice: Subject to any disclaimer, the term of this patent is extended or adjusted under 35 U.S.C. 154(b) by 0 days.

(21) Appl. No.: 14/806,852

(22) Filed: Jul. 23, 2015

(65) Prior Publication Data

US 2016/0023545 A1    Jan. 28, 2016

(30) Foreign Application Priority Data

Jul. 23, 2014  (IT) .............................. TO2014A0586

(51) Int. Cl.
| | | |
|---|---|---|
| *B60J 7/11* | (2006.01) | |
| *B60J 7/12* | (2006.01) | |
| *B60J 7/185* | (2006.01) | |
| *B60J 7/22* | (2006.01) | |

(52) U.S. Cl.
CPC .................. *B60J 7/11* (2013.01); *B60J 7/1226* (2013.01); *B60J 7/1851* (2013.01); *B60J 7/226* (2013.01); *B60J 10/90* (2016.02)

(58) Field of Classification Search
CPC ............. B60J 7/185; B60J 7/1851; B60J 7/19; B60J 7/192; B60J 7/194; B60J 7/10; B60J 7/11; B60J 7/12; B60J 7/106; B60J 7/04; B60J 7/16; B60J 7/061; B60J 7/067; B60J 7/1291
USPC ........................................ 296/218, 224, 121
See application file for complete search history.

(56) References Cited

U.S. PATENT DOCUMENTS

| | | | | |
|---|---|---|---|---|
| 1,746,779 A | * | 2/1930 | Henri-Labourdette | B60J 7/1204 296/218 |
| 2,723,698 A | * | 11/1955 | McGuinness | F16B 39/34 411/302 |
| 3,352,600 A | * | 11/1967 | Wilfert | B60J 7/04 296/216.02 |
| 4,120,529 A | * | 10/1978 | Chrysler | B60J 7/106 296/218 |
| 4,491,361 A | * | 1/1985 | Kolb | B60J 7/123 296/107.04 |

(Continued)

FOREIGN PATENT DOCUMENTS

| | | |
|---|---|---|
| EP | 2364869 A1 | 9/2011 |
| GB | 2267063 A | 11/1993 |

OTHER PUBLICATIONS

Italian Search Report and Written Opinion for Italian Patent Application No. IT TO20140586 dated Mar. 27, 2015.

*Primary Examiner* — Dennis H Pedder
(74) *Attorney, Agent, or Firm* — McCarter & English, LLP

(57) ABSTRACT

A motor vehicle has a crosspiece, which frontally delimits an upper opening of the passenger compartment and is covered, towards the passenger compartment, by a finishing wall; the upper opening is suited to be closed by a removable top; the top has a cloth supported by two side longitudinal members and is provided with a front portion which is arranged above a rear projection of the crosspiece, when the top is mounted, with a sealing element arranged between them; the top is provided with at least one flap having an upper end secured to the cloth and a lower end portion, which faces the finishing wall and is fixed with respect to the crosspiece thanks to the locking exerted by at least one releasable fastener.

16 Claims, 4 Drawing Sheets

(56) References Cited

U.S. PATENT DOCUMENTS 5,979,969 A 11/1999 Hilliard et al.
2004/0130188 A1* 7/2004 Stevens .................... B60J 7/10
296/218

* cited by examiner

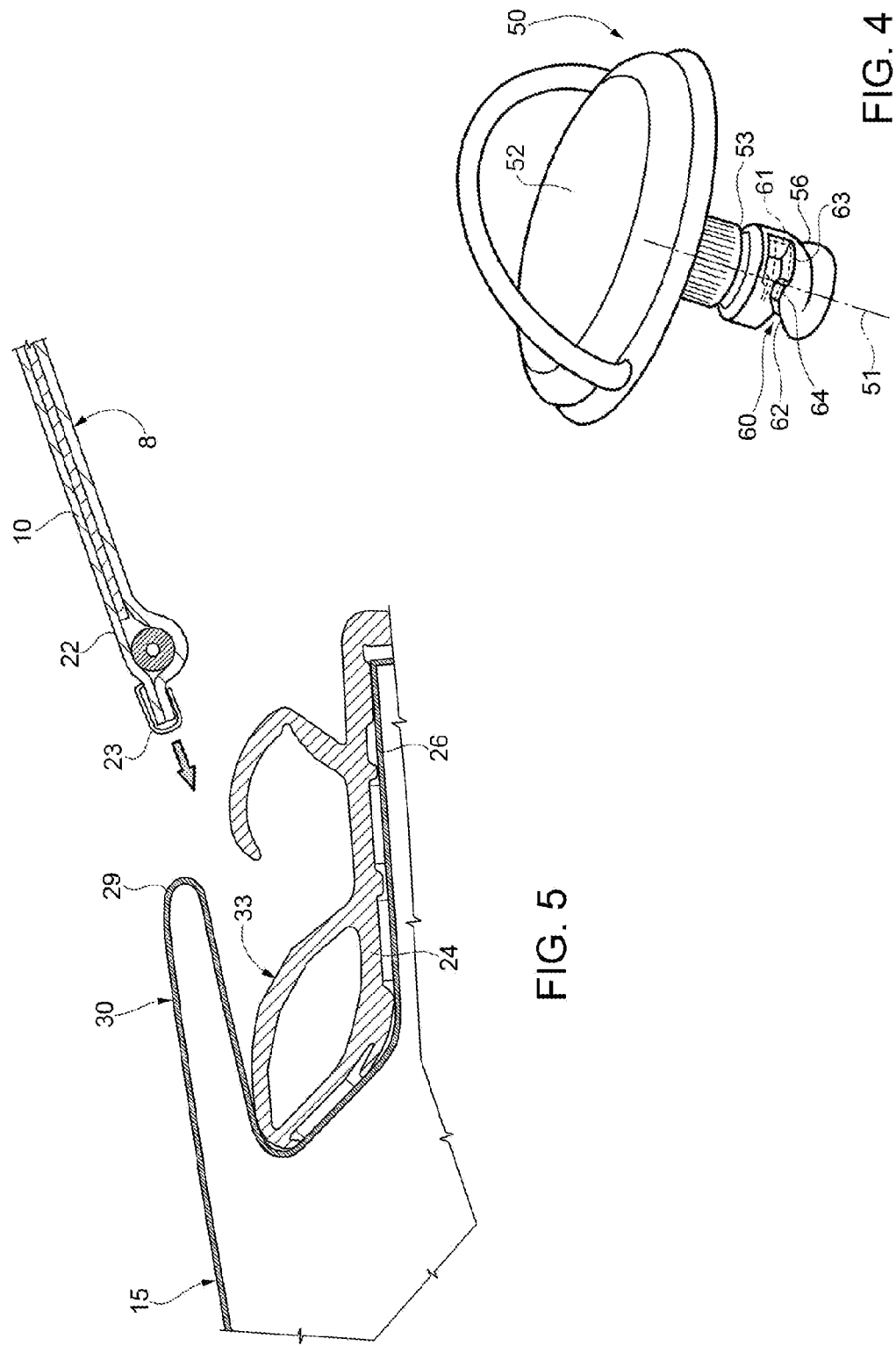

MOTOR VEHICLE PROVIDED WITH A REMOVABLE TOP

The present invention relates to a motor vehicle provided with a removable top.

BACKGROUND OF THE INVENTION

Motor vehicles are known wherein the roof of the passenger compartment is defined by a convertible top. In some solutions the top can be collected and folded in a housing space or in a boot behind the passenger compartment. In other solutions, the top is completely removable.

In sport type motor vehicles which can reach relatively high cruising speed, there exists the problem of ensuring of an effective seal along the edges of the top, in particular along the front edge.

GE936485A describes a solution which corresponds to the preamble of claim 1 and which provides a sealing gasket supported by the front transverse edge of the top and resting against a crosspiece, arranged along the upper edge of the windscreen of the motor vehicle. In GB936485A, the top is coupled to the crosspiece by means of a locking device with lever actuation. When the top is locked, the sealing gasket is compressed against the crosspiece.

The known solutions of the type just described do not fully meet the requirement of ensuring a good aero-acoustic performance in case the top is provided with a soft cloth and is completely removable. For said applications, in fact, at high speeds, there is a proven risk of having high noise in the passenger compartment, due to air leakage between the front edge of the cloth and the sealing gasket.

Moreover, the locking device illustrated in GE936485A is relatively complex, since it has a relatively high number of components. In addition, there is the risk that said device does not meet the aesthetic-quality requirements necessary for all components on full display in the passenger compartment.

SUMMARY OF THE INVENTION

The object of the present invention is to provide a motor vehicle provided with a removable top, which allows solving the problems described above in a simple and inexpensive way by means of a fixing system which ensures good aero-acoustic performance even at high speeds and preferably without overcomplicating the top assembly/disassembly operations.

According to the present invention, a motor vehicle provided with a removable top, as defined in claim 1 is made.

BRIEF DESCRIPTION OF THE DRAWINGS

For a better understanding of the present invention a preferred embodiment, purely by way of non-limiting example, with reference to the accompanying drawings is now described, wherein:

FIG. 4 illustrates, in perspective, a component shown in FIGS. 2 and 3; and

FIG. 5 is similar to FIG. 3 and shows the front edge of the top of FIG. 1 during an assembly step.

DETAILED DESCRIPTION OF THE INVENTION

Figure 1:
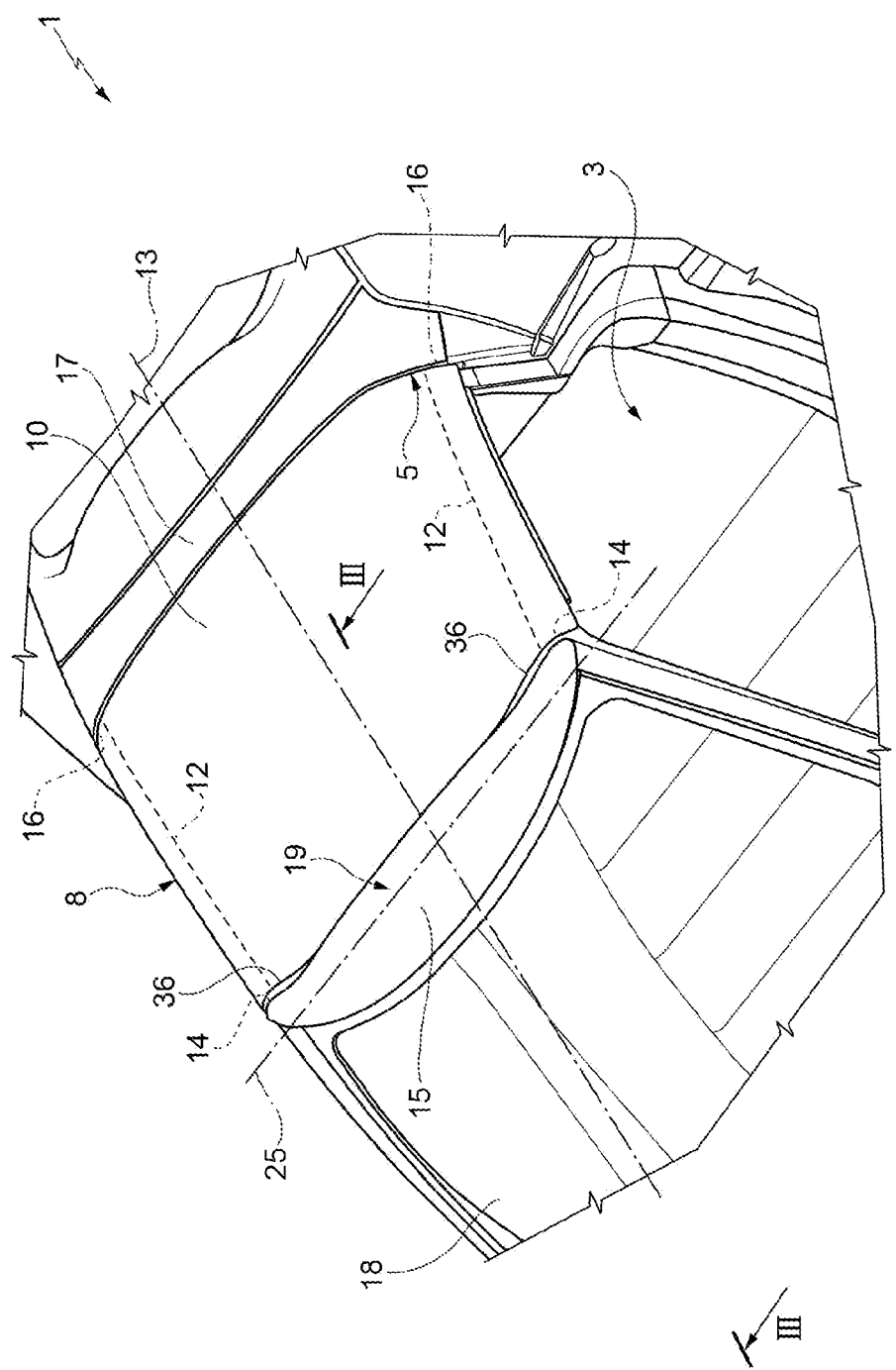
FIG. 1 is a perspective that shows, with parts removed for clarity, a preferred embodiment of the motor vehicle provided with a removable top, according to the present invention.

In FIG. 1, the reference number 1 indicates, as a whole, a convertible motor vehicle (partially illustrated). The motor vehicle 1 comprises a passenger compartment 3 having an upper opening 5, which can be opened and closed by removing and, respectively, by mounting a top 8. FIG. 1 shows the top 8 when the latter is mounted and secured to a frame or body of the motor vehicle 1.

The top 8 is a soft type, i.e. comprises a covering cloth 10, which is reinforced in a manner not described in detail. The top 8 comprises two longitudinal side members 12 (FIG. 2), which are substantially parallel to a longitudinal direction 13 of the motor vehicle 1. The structure of the top 8 is such as to be suited to fold or wrap the cloth 10 around the longitudinal side members 12 when the top 8 is completely removed from the motor vehicle.

Figure 3:
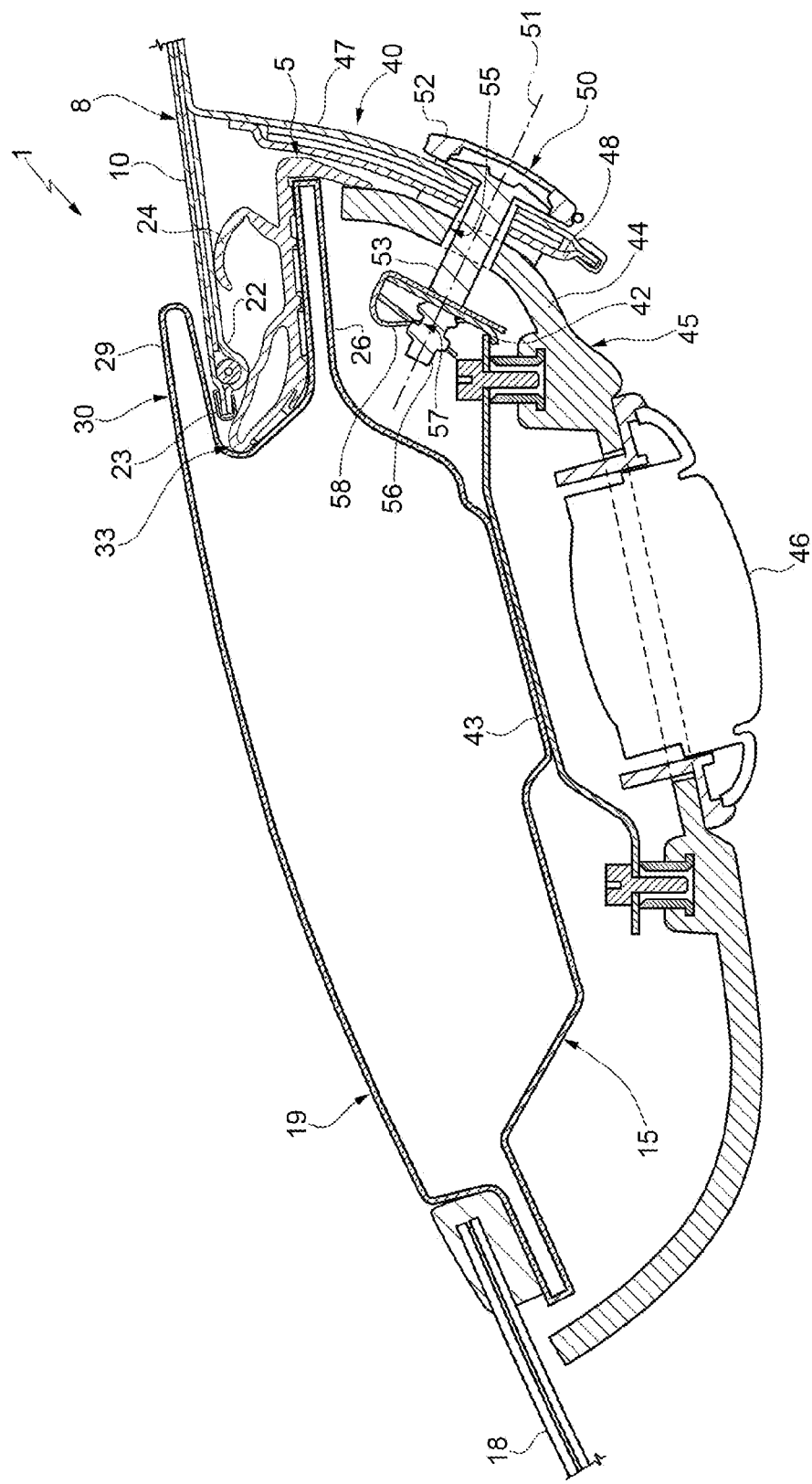
FIG. 3 is a cross section, on an enlarged scale, according to a vertical section plane indicated by the line III-III in FIG. 1.

The longitudinal side members 12 have respective front ends 14 secured to a crosspiece 15 and respective rear ends 16 secured to a crosspiece 17. With reference to FIG. 3, the crosspiece 15 extends along an upper transverse edge of a windscreen 18 of the motor vehicle 1, frontally defines the opening 5, has a top surface 19, which defines part of the outer profile of motor vehicle 1, and is preferably formed by a single box-like body.

Figure 2:
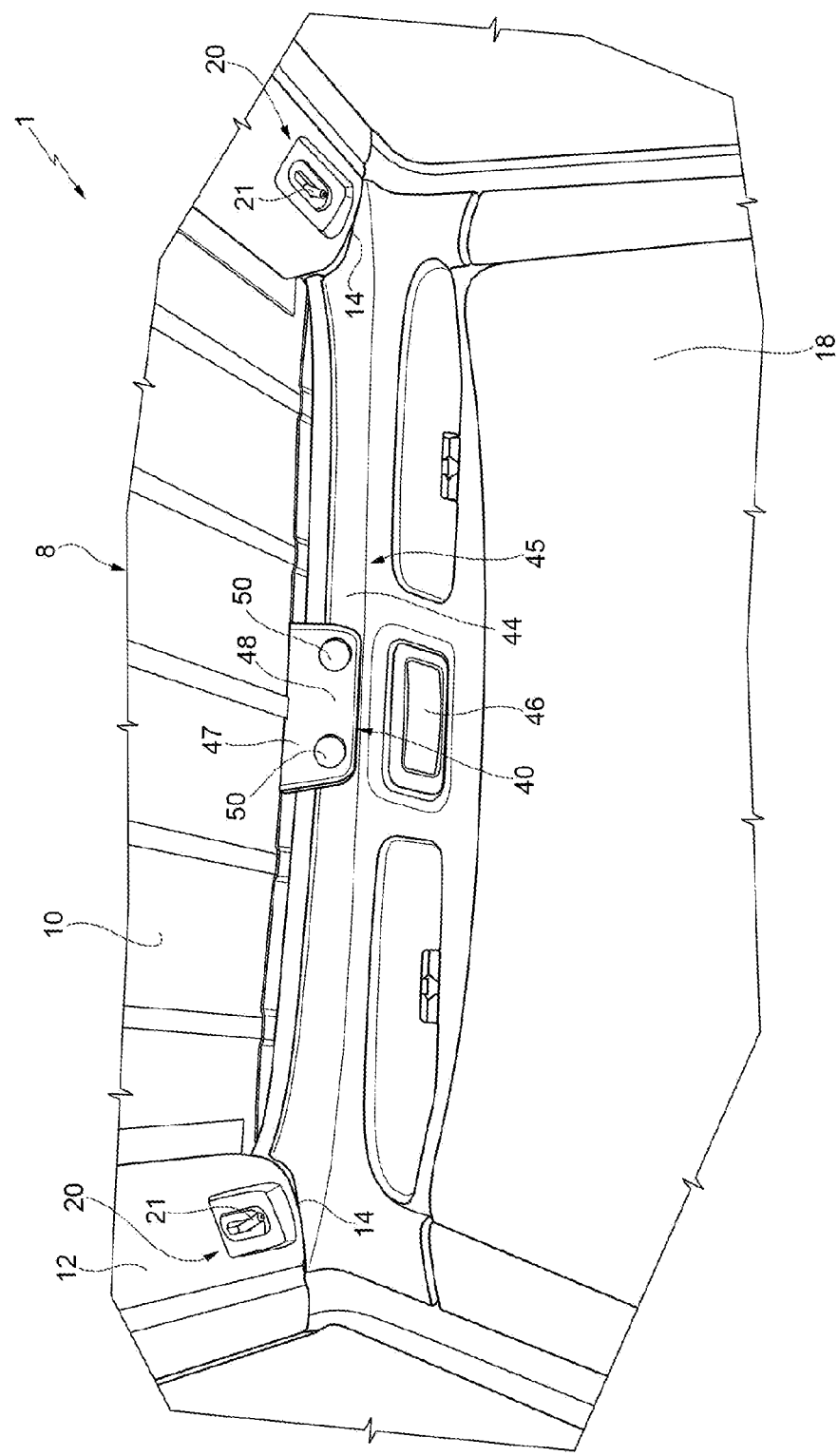
FIG. 2 is a view from inside of the passenger compartment of motor vehicle of FIG. 1.

As partially shown in FIG. 2, the fastening to the crosspieces 15, 17 is obtained by means of four releasable locking devices 20 supported respectively by the ends 14 and 16. The devices 20 comprise respective latches (not shown), which are movable between a retracted position, wherein they are housed in the ends 14 and 16, and an advanced position, wherein they longitudinally protrude from the longitudinal side members 12 to engage respective retaining seats (not shown) arranged at the lateral ends of the crosspieces 15 and 17. To cause the displacement of the latches independently one from the other, the devices 20 comprise respective control elements manually operated, for example, respective levers 21, accessible from the passenger compartment 3.

With further reference to FIG. 3, the cloth 10 comprises a front portion 22, which ends with an edge 23 and is coupled to the crosspiece 15 in a sealing manner by means of at least one sealing element 24. The edge 23 and the sealing element 24 are elongated along a direction 25 (FIG. 1), which is transverse to the direction 13 and is slightly curved. In particular, the sealing element 24 extends for the entire length of the edge 23.

The sealing element 24 arranged above a projection 26 of the crosspiece 15, is secured to the projection 26 and forms a support for the portion 22. Alternatively, the sealing element 24 could be secured to the portion 22 and form a support for the crosspiece 15. In particular, the projection 26 is flat and substantially horizontal.

According to one aspect of the present invention, the crosspiece 15 comprises a wing or spoiler 29 arranged above the projection 26 and has an upper face 30 which defines a rear end of the surface 19. The spoiler 29 and the projection 26 are vertically spaced apart so as to define a groove 33 between each other, which is elongated along the direction 25, is frontally blind, is open at the back, accommodates at least partially the sealing element 24 and, when the top 8 is mounted, is engaged by the portion 22.

With reference to FIG. 1, along the direction 25, the spoiler 29 and, therefore, the groove 33 preferably have a length which is less than that of the edge 23. In other words, only a central area of the portion 22 occupies the groove 33, while the edge 23 has two opposite ends 36 that are uncovered at the top.

Again with reference to FIG. 3, when the motor vehicle 1 is travelling the spoiler 29 guides the flow of air beyond the portion 22 and prevents said flow of air from impacting against the edge 23 and/or against the sealing element 24. In other words, due to the speed of the air flow which leaves the surface 19 and then passes on the upper surface of the top 8, the spoiler 29 causes a deviation of the air flow such as to prevent air from entering between the portion 22 and the sealing element 24.

The overhang of the spoiler 29 along the direction 13 is determined in the design step also with the aim of obtaining this technical effect, as a function of the maximum speed to be attained by the motor vehicle 1. The height of the groove 33 (i.e. the distance between the projection 26 and the spoiler 29) is determined in the design step in order to house the sealing element 24 and also to leave a sufficient space for easily inserting the edge 23 into the groove 33 during assembly of the top 8 (FIG. 5), but still leaving a relatively small height between the portion 22 and the spoiler 29 when the top 8 is mounted (FIG. 3).

With high travel speeds, for example greater than 140 Km/h, because of the flexibility of the cloth 10 the noise in the passenger compartment tends to increase. In particular, the aerodynamic effect tends to "inflate" the cloth 10; as a result, the edge 23 tends to rise, and then tends to reduce the pressure on the sealing element 24, so that air leakage occurs in the passenger compartment.

To overcome these drawbacks, according to one aspect of the present invention, a retaining device 40 is provided in the passenger compartment 3 to constrain the cloth 10 to a support structure 42, which is fixed with respect to the crosspiece 15. In particular, the structure 42 is defined by a plate secured, in a manner not shown, to a lower portion 43 of the crosspiece 15 and supports a finishing wall 44, which defines a surface 45 of the passenger compartment 3, covers the portion 43 and the structure 42 and supports, in turn, a ceiling light 46 (illustrated in a simplified way).

The device 40 comprises at least one tab or flap 47, the shape of which is preferably similar to that of a sun visor (FIG. 2). The flap 47 is an additional element positioned on the lower face of the cloth 10 and secured to the latter, for example by sewing, so as to have a certain freedom of rotation about a horizontal axis orthogonal to the direction 13.

The flap 47 is made of the same material of the cloth 10. However, other flexible materials could be used to produce the flap 47.

The flap 47 is secured to the cloth 10 in a position longitudinally spaced from the edge 23, so as to be external to the groove 33 when the top 8 is mounted. Furthermore, the flap 47 has a sufficient height to be able to support a lower end portion 48 of the flap 47 against the wall 44.

The device 40 also comprises at least one locking member 50, fixing the portion 48 to the structure 42. Preferably, as seen in FIG. 2, the device 40 comprises two members 50 spaced apart along the direction 25.

With reference to FIGS. 3 and 4, each member 50 extends along an axis 51 transverse to the flap 47 and comprises a head 52, which is coupled to the portion 48 in a fixed axial position and so as to be rotatable in response to a manual action of a user. The member 50 also comprises a pin 53, which is coaxial and fixed with respect to the head 52, passes through a hole 55 of the wall 44 and comprises an end portion 56 which engages a retaining seat 57. The seat 57 is defined by an elastically deformable element 58 (for example by a metal plate) secured to the structure 42. The portion 56 and the seat 57 are configured so as to achieve locking and releasing by turning the member 50 in opposite directions by 90°, for example with a threaded coupling, a cam and tappet coupling or a bayonet coupling.

As shown in FIG. 4, preferably the portion 56 has at least one groove 60 that has an angular amplitude of about 90° and is engaged by a tooth 61 of the element 58 (illustrated in a simplified manner in dashed lines). The groove 60 consists of a helical portion 62, defining an inlet/outlet for the tooth 61, and by an arch-shaped portion 63, lying on a plane orthogonal to the axis 51. At the junction between the portions 62 and 63 a protrusion 64 is provided with an un-screwing function, as it is suited to retain the tooth 61 in the portion 63 of the groove 60 when the member 50 is locked. By rotating the member 50 to cause the unlocking, the element 58 is elastically deformed to allow the tooth 61 to pass beyond the protrusion 64 and along the portion 62.

With reference to FIGS. 2 and 3, when the portion 48 of the flap 47 is secured to the crosspiece 15 by means of the members 50 and the structure 42, the cloth 10 is held slightly downwards in tension to maintain the sealing element 24 compressed.

FIG. 5 shows that, for mounting the top 8, it is appropriate to insert the edge 23 into the groove 33 with a small inclination of the cloth 10 with respect to the horizontal direction. The limitation of the extension of the spoiler 29 to the central part of the opening 5 facilitates the insertion and subsequent coupling of the ends 14 of the longitudinal side members 12 at the lateral ends of the crosspiece 15.

From the foregoing it appears evident that the retaining device 40 contributes to reduce wind noise in the passenger compartment 3 at high speed and, in its preferred configuration described by way of example, has a relatively high aesthetic value.

Not only that, but the flap 47 is extremely simple to produce, as it involves a relatively low number of components compared to the known solutions and is extremely simple to handle in order to make the cloth 10 fixed with respect to the crosspiece 15.

In addition, the spoiler 29 allows to limit air drafts in the passenger compartment 3 along the edge 23 of the cloth 10 and involves only a small complication during assembly, that is the insertion of the top 8 in an inclined direction (FIG. 5). However, by freeing the upper ends 36 of the edge 23, said insertion is relatively easy.

As a result, finally, it is clear that the motor vehicle 1 described and illustrated herein can be modified and varied without thereby departing from the protective scope of the present invention, as defined in the appended claims.

In particular, the spoiler 29 and/or the flap 47 may have a different shape and/or dimensions from those illustrated by way of example. Furthermore, the device 40 could comprise two flaps 47, defined for example by respective strips of fabric, spaced apart along the direction 25.

In addition, the cloth 10 may be supported by a frame having different characteristics from the longitudinal members 12.

Finally, the members 50 may be replaced by other releasable type fasteners, for example, by pressure fasteners, and/or may be hooked to the wall 44, instead of the structure 42.

The invention claimed is:

1. A motor vehicle comprising:
   a passenger compartment having an upper opening;
   a crosspiece frontally defining said upper opening and covered, towards said passenger compartment, by a finishing wall;
   a top, which closes said upper opening, is removable by a user to open said passenger compartment at the top and comprises a frame and a cloth supported by said frame; a front portion of said top being arranged above a rear projection of said crosspiece when the top is mounted, at least one sealing element arranged between said front portion and said rear projection when the top is mounted;
   characterized in that said top comprises at least one flap, made of a flexible material and having an upper end secured to said cloth and a lower end portion resting against said finishing wall when the top is mounted; at least one fastener engaging said lower end portion and fixing said lower end portion with respect to said crosspiece in a releasable manner, and
   characterized in that said flap is made of the same material as said cloth.

2. A motor vehicle according to claim 1, characterized in that said top comprises a single flap at the middle.

3. A motor vehicle according to claim 2, characterized by comprising two fasteners spaced horizontally apart from each other.

4. A motor vehicle according to claim 1, characterized in that said fastener comprises a pin, which is rotationally coupled to said lower end portion in a fixed axial position and, when the top is mounted, engages a corresponding retaining seat, which is fixed with respect to said crosspiece; said pin and said retaining seat being configured to perform blocking and releasing functions by means of rotations in opposite directions.

5. A motor vehicle according to claim 4, characterized in that said pin and said retaining seat define a bayonet coupling.

6. A motor vehicle according to claim 4, characterized in that said retaining seat is defined by an elastically deformable element.

7. A motor vehicle according to claim 4, characterized in that said retaining seat is arranged on a structure, which is secured, to a lower portion of said crosspiece and supports said finishing wall.

8. A motor vehicle according to claim 1, characterized in that said frame consists of two side longitudinal members which are substantially parallel to a longitudinal direction of the motor vehicle.

9. A motor vehicle comprising:
   a passenger compartment having an upper opening;
   a crosspiece frontally defining said upper opening and covered, towards said passenger compartment, by a finishing wall;
   a top, which closes said upper opening, is removable by a user to open said passenger compartment at the top and comprises a frame and a cloth supported by said frame; a front portion of said top being arranged above a rear projection of said crosspiece when the top is mounted, at least one sealing element arranged between said front portion and said rear projection when the top is mounted;
   characterized in that said top comprises at least one flap, made of a non-metallic flexible material and having an upper end secured to said cloth and a lower end portion resting against said finishing wall when the top is mounted; at least one fastener engaging said lower end portion and fixing said lower end portion with respect to said crosspiece in a releasable manner.

10. A motor vehicle according to claim 1, wherein the front portion defines an edge and the flap is secured to the cloth in a position longitudinally spaced rearward from the edge.

11. A motor vehicle according to claim 1, wherein the lower end portion of the flap is fixed to the crosspiece by the at least one fastener and holds the cloth in tension to compress the sealing element.

12. A motor vehicle according to claim 1, wherein the crosspiece comprises the rear projection and a spoiler that are vertically spaced apart to define a groove.

13. A motor vehicle according to claim 12, wherein the groove is configured to receive an edge of the front portion of the top.

14. A motor vehicle according to claim 13, wherein opposite ends of the edge extend beyond the groove such that the opposite ends are externally disposed with respect to the groove when the top is mounted.

15. A motor vehicle according to claim 13, wherein the flap is configured to be external of the groove when the top is mounted.

16. A motor vehicle according to claim 15, the flap is secured to the cloth in a position longitudinally spaced rearward from the edge.

\* \* \* \* \*